(12) United States Patent
Bader

(10) Patent No.: US 9,603,372 B2
(45) Date of Patent: Mar. 28, 2017

(54) WOOD CHIP SMOKER FOR OUTDOOR GRILLS

(71) Applicant: Emil Paul Bader, Cincinnati, OH (US)

(72) Inventor: Emil Paul Bader, Cincinnati, OH (US)

(*) Notice: Subject to any disclaimer, the term of this patent is extended or adjusted under 35 U.S.C. 154(b) by 18 days.

(21) Appl. No.: 14/726,728

(22) Filed: Jun. 1, 2015

(65) Prior Publication Data

US 2016/0345598 A1     Dec. 1, 2016

(51) Int. Cl.
| | |
|---|---|
| *A23B 4/03* | (2006.01) |
| *A23B 4/044* | (2006.01) |
| *B60H 3/00* | (2006.01) |
| *A23B 4/052* | (2006.01) |

(52) U.S. Cl.
CPC .................. *A23B 4/0523* (2013.01)

(58) Field of Classification Search
CPC .... A23B 4/052; A23B 4/0523; A47J 37/0718; A47J 37/0786
USPC ................ 99/473, 480, 482, 450; 126/25 R; 426/534
See application file for complete search history.

(56) References Cited

U.S. PATENT DOCUMENTS

| | | | | |
|---|---|---|---|---|
| 5,768,983 A | * | 6/1998 | Treiber ................. | A23B 4/052 126/275 R |
| 6,481,344 B1 | * | 11/2002 | Green .................... | A23B 4/052 99/467 |
| 2003/0051608 A1 | * | 3/2003 | Prip ........................ | A47J 43/18 99/450 |
| 2004/0025714 A1 | * | 2/2004 | Neal ..................... | A23B 4/0523 99/482 |
| 2007/0256572 A1 | * | 11/2007 | Davis .................. | A47J 37/0786 99/482 |
| 2008/0163765 A1 | * | 7/2008 | O'Shea ............... | A47J 37/0713 99/482 |
| 2014/0261015 A1 | * | 9/2014 | Nelson .................. | A23B 4/052 99/467 |
| 2014/0261016 A1 | * | 9/2014 | Kaderli ................ | A23B 4/0523 99/473 |

\* cited by examiner

*Primary Examiner* — Dana Ross
*Assistant Examiner* — Lindsey C Staubach
(74) *Attorney, Agent, or Firm* — Wm. Cates Rambo

(57) ABSTRACT

A wood chip smoker is adapted for use in an outdoor grill that has a grate and a cover movable between open and closed positions. The smoker has a base for placement on the grill grate, a perforated section mounted on the base and provided with open spaces that collectively define an inlet area, a chimney extending above the perforated section, a regulator mounted on the chimney and movable between open and closed positions for the introduction of wood chips, and an outlet area for the outflow of smoke formed in at least one of the chimney and regulator, said outlet area being between 2 and 25% of the inlet area in size.

10 Claims, 6 Drawing Sheets

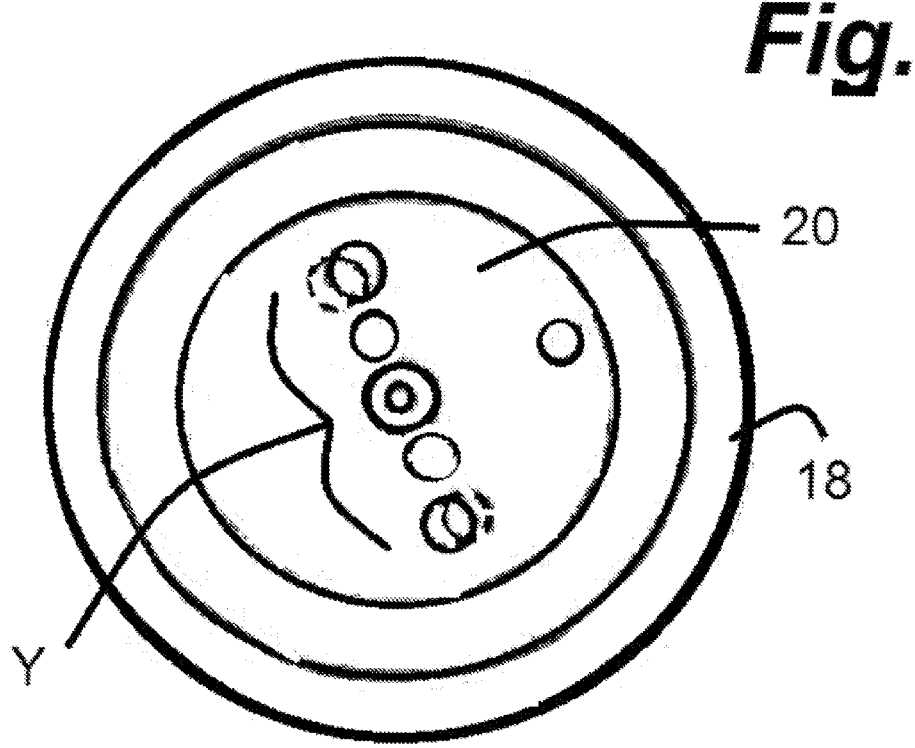

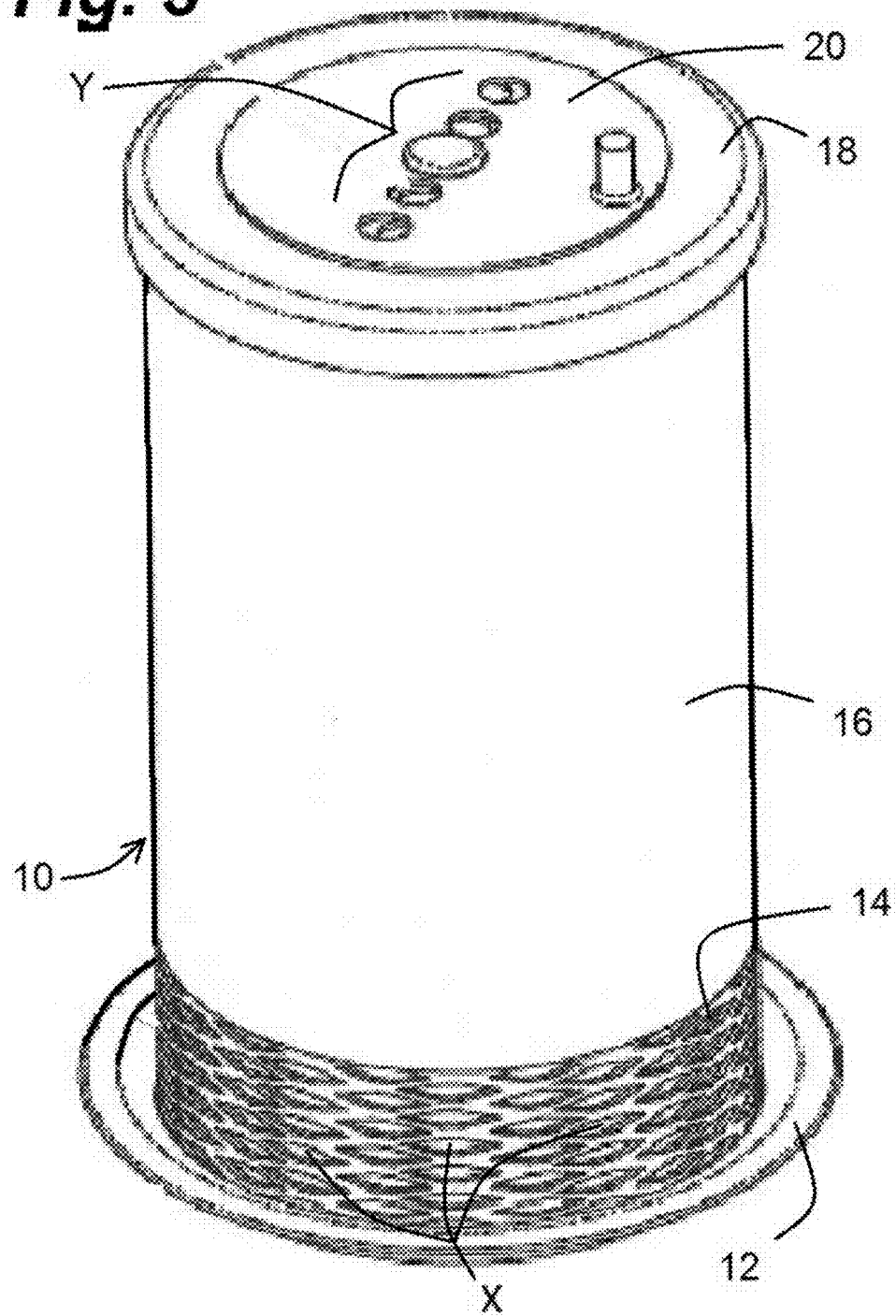

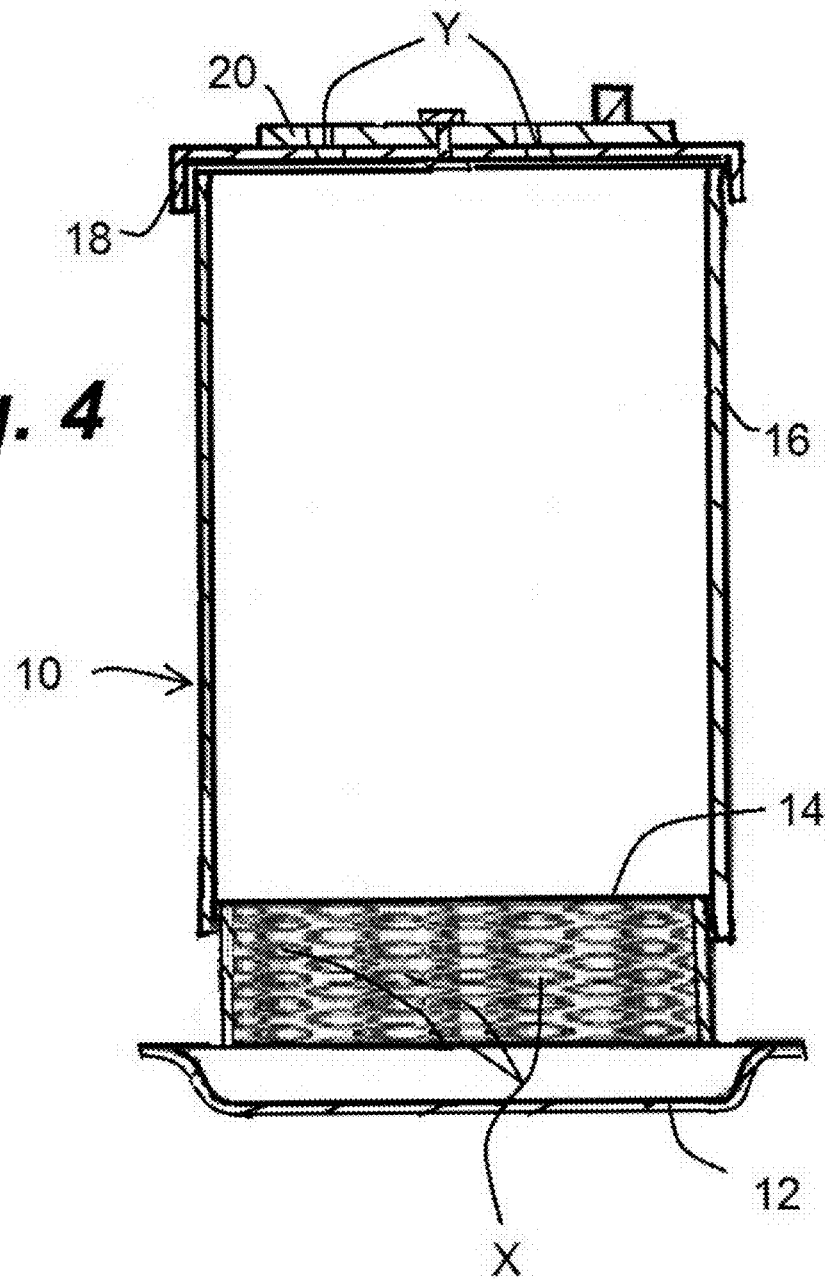

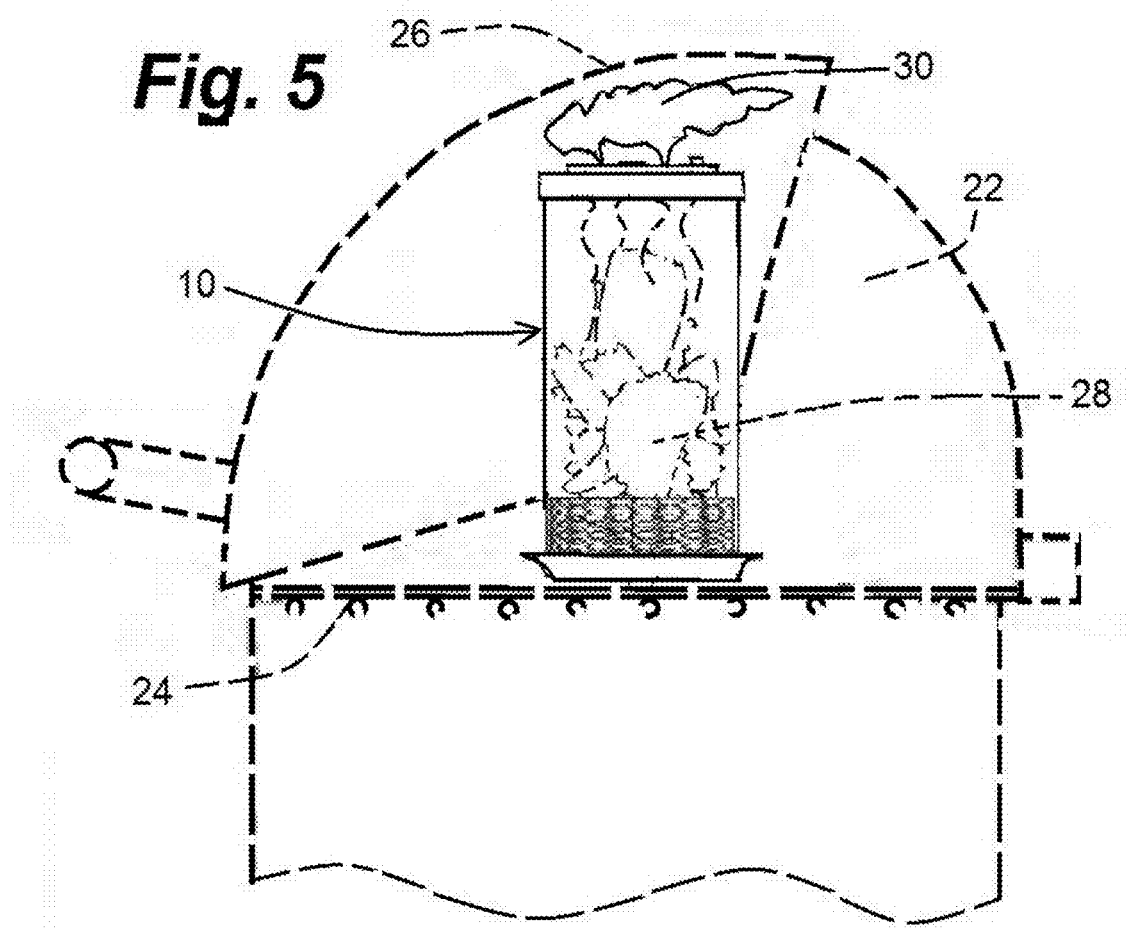

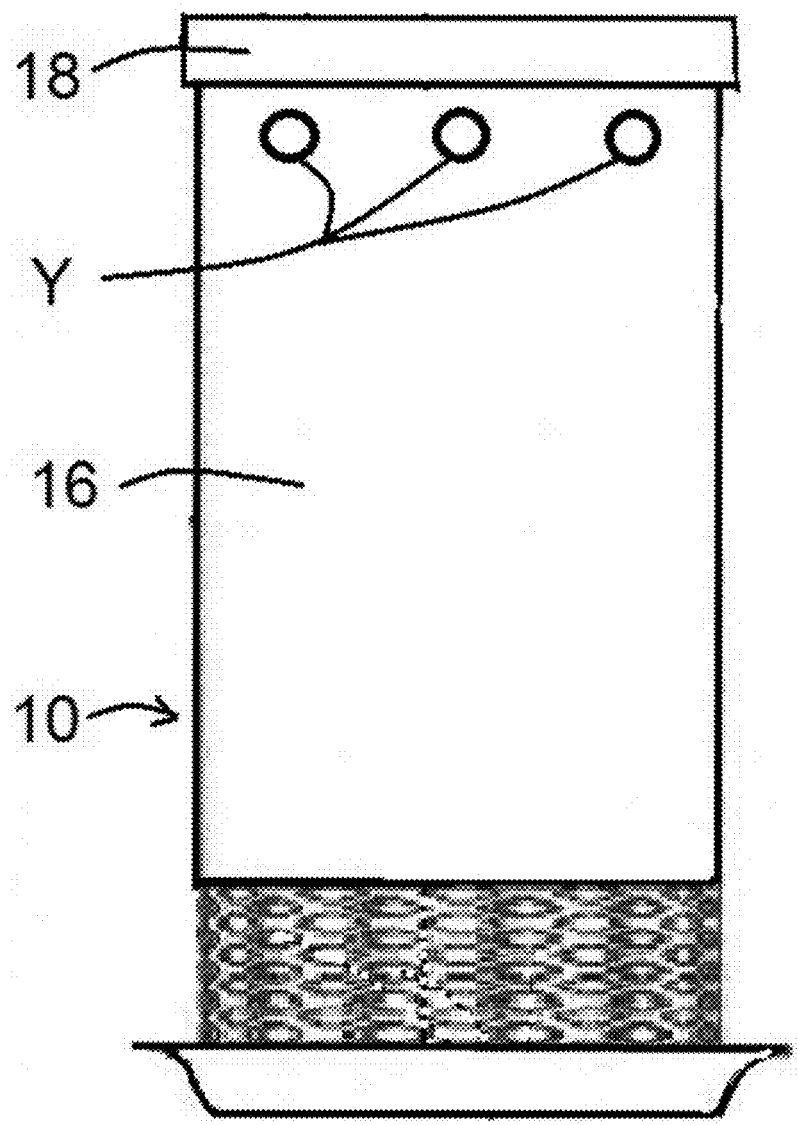

WOOD CHIP SMOKER FOR OUTDOOR GRILLS

RELATED APPLICATION

The present non-provisional application is based upon and claims the priority of U.S. Provisional Application No. 62/112,279 filed Feb. 5, 2015.

BACKGROUND OF THE INVENTION

The present invention relates to apparatus for smoking food, and more particularly to a wood chip smoker adapted for outdoor grills.

Users of gas grills cannot create food with the desired taste and smoke characteristics delivered from dedicated wood burning smokers using existing smoke boxes, containers and other methods commonly found on the market, cook books or internet.

Smoke boxes are generally comprised of a box or container to hold water soaked wood chips with a lid with holes that allow for smoke to dissipate or pouches constructed of aluminum foil with holes punched in the pouch. These smoke boxes or containers are typically placed on the grill near or in contact with the burner flame or on hot coals. The process for generating smoke in these devices begins by heating the wood chips and vaporizing the water in the wet/saturated wood chips. This process essentially creates a high humidity environment in the grill which essentially steam cooks the food and does not create the desired taste of smoke in food during the initial stages of the cooking process.

After the initial steam induction phase the wood chips in a conventional smoke box or container begin to char as the volatile components of the wood vaporize. This imparts some flavor but not the desired smoke accents and smoke rings delivered from a wood burning dedicated smoker. Conventional smoke boxes require high heat generated by the barbeque device or placement directly on the flame or coals to maintain smoldering and some smoke. This limits the ability to regulate heat and cook at low temperatures for extended times. Conventional smoke boxes will combust wood chips in flames and limit the smoke production if the moisture level and heat are not correctly balanced leading to limited to no smoke. Conventional smoker boxes require a period of time to begin the smoke process. This creates a lag period of no smoke or extended warm-up periods during the start of cooking and during refills. Due to the limitations of conventional smoke boxes, containers and methods described above, their ability to impart smoke taste and smoke rings in food comparable to that achieved in dedicated wood burning smokers is limited.

The smoke process can be extinguished by removal of the heat source especially early in the process where the wood is wet from water soaking or not in the combustion phase. Conventional smoke boxes do not allow for controlling smoke quality or output. Wood from different species placed in a conventional smoke box will generate smoke that is commingled during the smoking process and will not allow for a separation of different wood species smoke flavor characteristics. Smoke time with conventional smoke boxes is generally a short period of time relative to the extended cook time required for some cuts of meat which limits the desired smoke characteristics and textures in meat needing extended cooking times. As can be seen, there is a need for a device to convert outdoor grills into smokers.

SUMMARY OF THE INVENTION

The present wood chip smoker is adapted for use in an outdoor grill that has a grate and a cover movable between open and closed positions. The smoker basically comprises a base for placement on the grill grate, a perforated section mounted on the base and provided with a plurality of open spaces that collectively define an inlet area, a chimney extending above the perforated section, a regulator mounted on the chimney and movable between open and closed positions for the introduction of wood chips, and an outlet area for the outflow of smoke formed in at least one of the chimney and regulator, said outlet area being between 2 and 25% of the inlet area in size.

BRIEF DESCRIPTION OF THE DRAWINGS

FIG. 2 is a top plan view of an upper portion of the smoker;

FIG. 3 is a perspective view of the present smoker;

FIG. 4 is a vertical sectional view thereof, taken along line 4-4 of FIG. 1;

FIG. 5 is a side elevational view of the present smoker disposed within an outdoor grill; and FIG. 6 is a side elevational view of an alternative form of the smoker, wherein outlet ports are formed in the chimney below the regulator.

DETAILED DESCRIPTION OF AN EXEMPLARY EMBODIMENT

Figure 1:
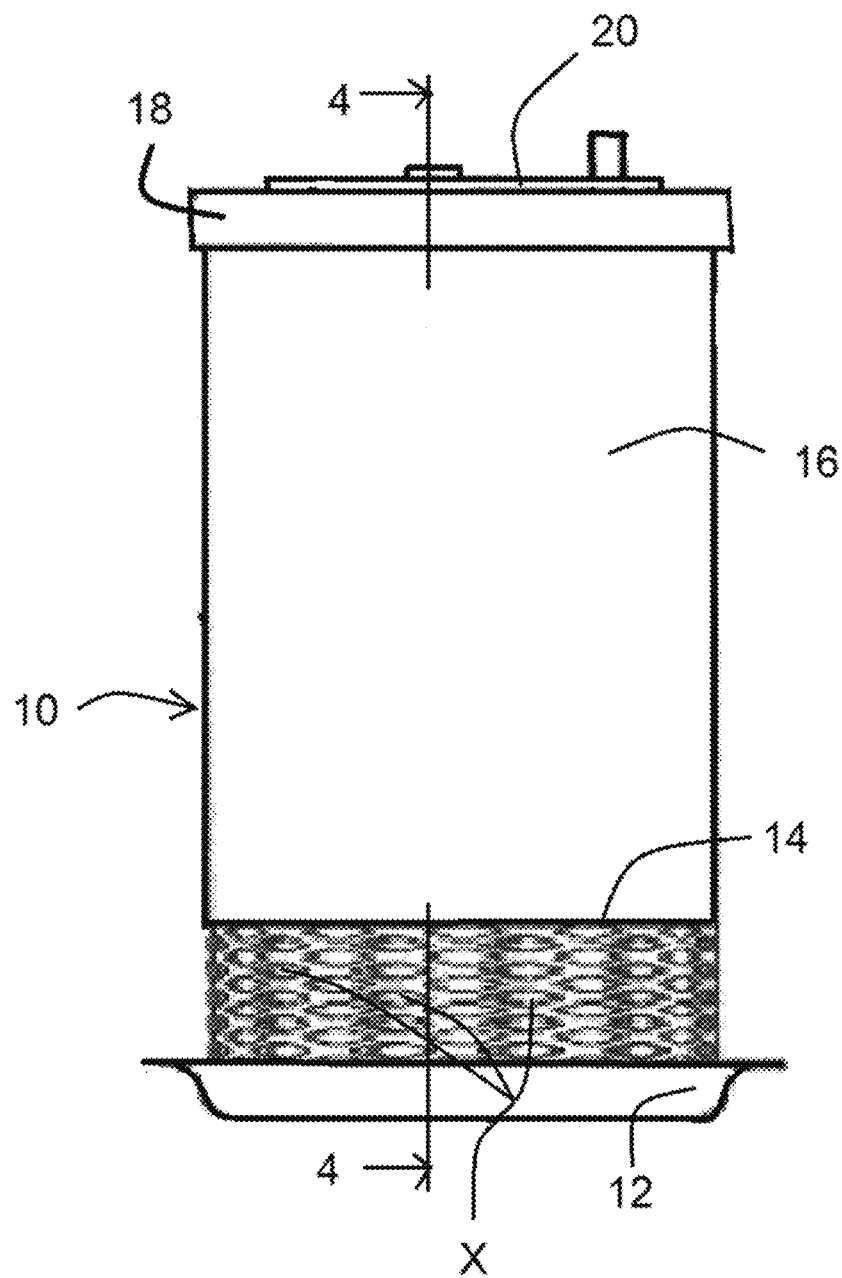
FIG. 1 is a side elevational view of a preferred embodiment of the wood chip smoker.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a smoker 10 for an outdoor grill 22 comprising: a base 12; a perforated section 14 attached to the base, wherein the perforated section comprises an interior housing; a chimney section 16 attached to the perforated section, wherein the chimney section has a top end and bottom end; and a regulating mechanism 18, which may be removably attached to the top end of the chimney section. The preferred embodiment is about 4 inches in diameter and about 8.5 inches in height to fit the majority of outdoor grills in the market place. The functionality of the device is not controlled by the height and can vary according to the interior height of the grill 22 in which the device is being used. The height determines the amount of smoke producing wood chips 28 the device can contain, which determines the uninterrupted smoke duration.

The present invention may provide a controlled and continuous supply of smoke 30 inside an outdoor grill 22, without needing to make modifications, to impart desired smoke flavors typically created by dedicated wood burning smokers. Desired smoke characteristics in food are achieved by cooking in a smoke atmosphere at low temperature for extended periods. To create smoke that imparts the desired characteristics in food in outdoor grills, the wood 28 needs to be combusted in the state of smoldering over the extended cooking periods. The present device may achieve the state of smoldering for wood of various species inside gas or charcoal grills for extended periods of time.

As is illustrated in the Figures, a wood chip smoker, generally designated 10, may include a base 12. The base 12 may be made from a noncombustible material, preferably a metal, to contain and separate the smoldering wood chips 28 from the grill grate 24 while providing a stable platform for the device. The base may be about 0.032" (0.081 cm) thick and may be fabricated from various sheet metals. The preferred base shape is a fluted cylinder about 0.5 inch (1.27 cm) in height with a closed bottom that allows for a stable unanchored placement of the smoker 10 on a grate 24 in an outdoor grill 22.

A perforated section 14 may be attached to the open upper end the base 12. The base may cover a lower end of the perforated section 14. The perforated section may allow for air entry and for smoldering. The perforated section may be formed from noncombustible material with a plurality of open spaces that collectively define an inlet area X. Inlet area X is preferably greater than 35% of the perforated section 14 and can be compromised of various shapes and structures. The preferred perforated section is comprised of stainless steel screening with 0.25" (0.635 cm) inlet openings and a total inlet area X that occupies 76% of the perforated section. The perforated section may have a vertical height between 0.5 and 2 inches (1.27-5.08 cm) with the preferred height of 1.25 inches (3.175 cm) measured from the top surface of the base.

A chimney section 16 may be attached to the perforated section 14. The chimney section may include a top end and a bottom end. The bottom end of the chimney section 16 and the perforated section 14 may be rigidly connected creating a tube shape. In certain embodiments, the tube may have a round cross section area, oval, square, triangular or the like. The total height of the smoker 10 is less than the distance from the grill grate 24 to an inside top surface of a closed grill lid 26 (FIG. 5). The chimney section may be comprised of noncombustible material preferable constructed of sheet metal with a solid surface with no perforations. The chimney provides a path for air and smoke flow through the top section while acting as a storage area for the wood chips 28 or the like that gravity feeds wood chips to the smoldering section. The preferable length of the chimney section is about 6.5 inches (16.51 cm), but the length can be designed for a specific grill space.

The perforated section 14 forms an interior housing that may allow for the containment of wood 28 or the like. The device may allow for separation from the grill grate 24, flame and grill heat source. The wood chips 28 in the device are ignited independently of the grill heat source, unlike conventional smoke boxes and methods which require the grill heat source to initiate and maintain smoke producing combustion. The base 12 provides a separation from the grill grate 24 and heat source while providing an area for the smoldering process to proceed inside the perforated section 14

A regulating mechanism or regulator 18 preferably governs the flow of air and smoke 30 through the perforated and chimney sections, thereby controlling the smoldering combustion. It may simply be a metal plate equipped with a fixed or adjustable outlet area Y, and may be removably attached to the top end of the chimney section 16. The regulator 18 may be substantially solid and removably cover an upper end of the chimney section 16. In certain embodiments, the regulating mechanism may be pivoted away from the top end of the chimney section to permit wood chips 28 to be introduced. In certain embodiments, the regulating mechanism 18 may be removed completely. The movement of the regulating mechanism may facilitate wood loading into the chimney section. The regulating mechanism may be made from noncombustible material. The regulator may have at least one fixed or adjustable outlet area Y. The outlet area Y may allow air and smoke to flow through and out of the chimney 16. In certain embodiments, the outlet area Y may simply be at least one hole drilled through the regulator 18. The regulator plate may be slightly larger than an outer cross sectional shape of the chimney section. A second plate 20 may be used to provide adjustability to the outlet area Y, with a rotation of the second plate 20 adjusting the size of the outlet area Y. If the size of the outlet area Y is fixed, it is preferably about 6.5% of the inlet area X on the perforated section 14. If the outlet area Y is adjustable, it is preferably between 2% to 25% of the inlet area X. The adjustable outlet area can be used to adjust the rate of smoldering and the quantity of smoke output.

Alternatively, the flow of smoke out of the smoker 10 may be through a plurality of ports that define the outlet area Y in an upper portion of the chimney 16, as illustrated in FIG. 6. In this arrangement, the regulator 18 may simply serve as a removable cover for the addition of wood chips.

A method of using the present invention may include the following. A user of the device may swing the regulating mechanism 18 away from the top end of the chimney section 16 exposing the open top end of the device. The user may then fill the device with dry wood chips 28 of his choosing. The user may choose to fill the device full for the longest smoke producing cycle or partially fill the device for shorter cycles. The wood chips do not have to be soaked in water as conventional smoke boxes and methods recommend. The user may place the device on the grill grate 24 sitting on the base 12 with the exposed top end still open.

The user may then ignite the wood chips 28 exposed in the perforated section with an external flame, such as with a propane lighter, using a similar technique for igniting charcoal starter chimneys. Once the wood chips have begun to burn and a coal bed is established, the user may close the regulating mechanism 18 and adjust the variable opening 20 to choke off the flame combustion, thereby establishing smoldering combustion. If a fixed opening embodiment is being used, no adjustment may be needed.

The user may then ignite the gas grill 22 and close the lid 26 and adjust the flame to deliver the desired cooking temperature. The grill can also be ignited as the user may be lighting the smoker 10. The perforated section 14 may be replenished by gravity feeding wood chips 28 that have been consumed by smolder combustion. Smoke output may diminish as the internal temperature of the grill increases above approximately 275 F. The device may produce the best smoke 30 at temperatures below approximately 275 F. Smoke may be continuously produced for approximately 90 minutes, depending on how the top oxygen and smoke regulator 18, 20 has been adjusted and how much wood was placed in the device.

If the user desires to extend the smoke time the device can be refilled in place, while in use, without interrupting smoke production. To refill the device the user may swing the regulating mechanism 18 open and replenish wood chips 28 into the chimney section 16. The user during the refilling process can select a different species of wood to tailor the taste profile. Wood of different species can also be layered in the device during the initial filling to tailor taste profiles. This cannot be accomplished in conventional smoke boxes which co-mingle wood and smoke. After the smoking cooking process may be completed and the device has cooled, the user may open the regulating mechanism 18 and empty the ash and remaining charred wood.

The same process and device can be used in charcoal barbeques. The device can be built into gas and charcoal grills as an added feature for grill manufactures to offer to consumers.

It should be understood, of course, that the foregoing relates to exemplary embodiments of the invention and that modifications may be made without departing from the spirit and scope of the invention as set forth in the following claims.

The invention claimed is:

1. A wood chip smoker for an outdoor grill, said grill having a grate and a cover movable between open and closed positions, said smoker comprising:
  a base for placement on the grate of the outdoor grill;
  a perforated section extending vertically above the base and having a plurality of open spaces collectively defining an inlet area for air flow into said perforated section;
  a chimney extending vertically above the perforated section, the vertical extent of said perforated section being substantially smaller than the vertical extent of said chimney;
  a regulator mounted on the chimney and movable between open and closed positions, said regulator permitting the introduction of wood chips in said open position; and
  an outlet area formed in at least one of the chimney and regulator for the outflow of smoke, said outlet area being within a range of 2 to 25% of the inlet area in size.

2. The wood chip smoker according to claim 1, wherein the perforated section extends a distance within a range of 0.5 inch to 2 inches above the base.

3. The wood chip smoker according to claim 1, wherein the inlet area is greater than 30% of the perforated section.

4. The wood chip smoker according to claim 1, wherein the smoker is placeable upon the grate of the outdoor grill, said smoker having a height permitting the cover to be closable upon said outdoor grill.

5. The wood chip smoker of claim 1, wherein the outlet area on the regulator is adjustable.

6. The wood chip smoker of claim 5, wherein a plate is movably mounted on the regulator to adjust the size of the outlet area.

7. The wood chip smoker according to claim 6, wherein the size of the outlet area affects the air flow into the perforated section.

8. The wood chip smoker according to claim 1, wherein the base defines a closed end.

9. The wood chip smoker according to claim 1, wherein the base, the perforated section and the chimney define a wood chip-receiving area with the regulator in the open position.

10. The wood chip smoker according to claim 9, wherein the open spaces in the perforated section enable the wood chips received therein to be ignited independently of the grill.

* * * * *